United States Patent
Ishino et al.

(10) Patent No.: US 9,549,111 B2
(45) Date of Patent: *Jan. 17, 2017

(54) IMAGE CAPTURING APPARATUS AND CONTROL PROGRAM PRODUCT WITH SPEED DETECTION FEATURES

(71) Applicants: SONY CORPORATION, Tokyo (JP); SONY MOBILE COMMUNICATIONS INC., Tokyo (JP)

(72) Inventors: Masahide Ishino, Tokyo (JP); Hiroaki Adachi, Tokyo (JP); Kensuke Mashita, Tokyo (JP); Yuuji Wada, Kanagawa (JP); Mitsuyo Usami, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/589,694

(22) Filed: Jan. 5, 2015

(65) Prior Publication Data
US 2015/0189143 A1    Jul. 2, 2015

Related U.S. Application Data

(63) Continuation of application No. 13/456,304, filed on Apr. 26, 2012, now Pat. No. 8,957,979.

(60) Provisional application No. 61/509,140, filed on Jul. 19, 2011.

(51) Int. Cl.
*H04N 5/232* (2006.01)
*H04N 5/235* (2006.01)

(52) U.S. Cl.
CPC ............ *H04N 5/232* (2013.01); *H04N 5/2353* (2013.01); *H04N 5/23219* (2013.01); *H04N 5/23222* (2013.01); *H04N 5/23245* (2013.01)

(58) Field of Classification Search
None
See application file for complete search history.

(56) References Cited

U.S. PATENT DOCUMENTS

| | | |
|---|---|---|
| 2006/0221223 A1 | 10/2006 | Terada |
| 2009/0059054 A1 | 3/2009 | Oishi et al. |
| 2009/0207279 A1 | 8/2009 | Ochi et al. |
| 2011/0043639 A1 | 2/2011 | Yokohata |

FOREIGN PATENT DOCUMENTS

| | | |
|---|---|---|
| JP | 2002-307876 A | 10/2002 |
| WO | WO 2008/087914 A1 | 7/2008 |

OTHER PUBLICATIONS

Extended Search Report issued Nov. 9, 2012 in European Patent Application No. 12173129.3.

*Primary Examiner* — Twyler Haskins
*Assistant Examiner* — Angel L Garces-Rivera
(74) *Attorney, Agent, or Firm* — Oblon, McClelland, Maier & Neustadt, L.L.P.

(57) ABSTRACT

A mobile terminal having a camera function includes a camera unit for capturing an image of a subject, and an image-capture control calculation unit that controls an image-capturing operation performed by the camera unit and that also calculates a movement speed of the subject that is being captured by the camera unit. Then, when the camera unit is performing continuous image capture, the image-capture control calculation unit dynamically changes and controls an image-capture time interval at the time of continuous image capture in accordance with a movement speed of the subject.

15 Claims, 11 Drawing Sheets

FIG. 4

| PART NAME | CONDITION | SCORE |
|---|---|---|
| FACE (HEAD PART) | INSIDE FRAME 10% OR MORE | 6 |
| | INSIDE FRAME 10% OR LESS | 4 |
| | INSIDE FRAME 5% OR LESS | 2 |
| | INSIDE FRAME 0% | – |
| ARM (HAND, FRONT LEG) | INSIDE FRAME 10% OR MORE | 3 |
| | INSIDE FRAME 10% OR LESS | 2 |
| | INSIDE FRAME 5% OR LESS | 1 |
| | INSIDE FRAME 0% | – |
| LEG (FOOT, REAR LEG) | INSIDE FRAME 10% OR MORE | 3 |
| | INSIDE FRAME 10% OR LESS | 2 |
| | INSIDE FRAME 5% OR LESS | 1 |
| | INSIDE FRAME 0% | – |
| ... | ... | ... |

FIG. 8

| PART NAME | CONDITION | SCORE |
|---|---|---|
| FACE (HEAD PART) | INSIDE FRAME 10% OR MORE | 6 |
| | INSIDE FRAME 10% OR LESS | 8(4 × 2) |
| | INSIDE FRAME 5% OR LESS | 2 |
| | INSIDE FRAME 0% | – |
| ARM (HAND, FRONT LEG) | INSIDE FRAME 10% OR MORE | 3 |
| | INSIDE FRAME 10% OR LESS | 2 |
| | INSIDE FRAME 5% OR LESS | 2(1 × 2) |
| | INSIDE FRAME 0% | – |
| LEG (FOOT, REAR LEG) | INSIDE FRAME 10% OR MORE | 3 |
| | INSIDE FRAME 10% OR LESS | 2 |
| | INSIDE FRAME 5% OR LESS | 2(1 × 2) |
| | INSIDE FRAME 0% | – |
| ... | ... | ... |

IMAGE CAPTURING APPARATUS AND CONTROL PROGRAM PRODUCT WITH SPEED DETECTION FEATURES

CROSS REFERENCE TO RELATED APPLICATION

This application is a Continuation of and is based upon and claims the benefit of priority under 35 U.S.C. §120 for U.S. Ser. No. 13/456,304, filed Apr. 26, 2012, and claims priority under 35 U.S.C. §119(e) to Provisional Application Ser. No. 61/509,140, filed on Jul. 19, 2011, the entire contents of which being incorporated herein by reference.

TECHNICAL FIELD

The present disclosure relates to an image capturing apparatus that captures, for example, a subject that is in motion or the like, and to an image-capture control program product for use in capturing am image of a subject by using the image capturing apparatus.

BACKGROUND ART

For example, Japanese Unexamined Patent Application Publication No. 2002-307876 (PTL 1) discloses an ID card creation system in which a face image in which the eyes are not closed is selected from a plurality of face images that are obtained by continuously capturing the face of a person whose image is to be photographed, and is thus capable of creating an ID card with an optimum face image in which the eyes are not closed. The ID card creation system described in this PTL 1 is configured to include image-capturing means, a recording medium, a control device, and card creation means. The image-capturing means continuously captures an image of the upper part of the body including the face of the subject for each relevant subject so as to obtain a plurality of pieces of face image information. The recording medium stores the plurality of pieces of face image information of the relevant subjects, which are obtained by the image-capturing means. The control device selects, for each subject, the face image with the most satisfactory eyes open state from among the plurality of pieces of face image data read from the recording medium. The card creation means creates an employee certificate on the basis of the face image data selected by the control device.

Furthermore, International Publication 08/087914 Pamphlet (PTL 2) discloses an image capturing apparatus that is capable of easily searching for a main image representing continuously captured images from among the plurality of continuously captured images obtained by performing continuous image capture. This image capturing apparatus is configured to include continuous image-capturing means, recording means, and main image selection means. The continuous image-capturing means continuously captures a plurality of images at a predetermined time interval that is determined by continuous image capture conditions that are preset by an image-capturing person. The recording means records image data corresponding to a plurality of captured images that are captured by the continuous image-capturing means as one image file on a recording medium. The main image selection means selects one main image from among the plurality of captured images recorded as one image file on a recording medium. Furthermore, the image capturing apparatus disclosed in PTL 2 is configured to be able to detect the amount of motion of a subject at the time of image capture and select, as a main image, the captured image with the smallest detected amount of motion of the subject. Furthermore, the image capturing apparatus disclosed in PTL 2 is configured in such a manner that whether or not a subject has his/her eyes closed is detected by recognizing the face of the subject when image capture is performed, and a captured image in which the eyes are closed is prohibited from being selected as a main image.

CITATION LIST

Patent Literature

[PTL 1] Japanese Unexamined Patent Application Publication No. 2002-307876 (FIG. 1)

[PTL 2] International Publication 08/087914 Pamphlet (FIG. 2)

SUMMARY OF DISCLOSURE

Technical Problem

By the way, in the case of the technology disclosed in the above-mentioned Patent Literature, a predetermined number of images are captured, and a desired image is selected from among the plurality of images.

However, in a case where, for example, an image of a subject that moves at a high speed or whose movement speed changes is to be captured, even if a plurality of images are captured by continuous image capture as described in the above-mentioned Patent Literature, there can occur a case in which there is no one satisfactory image among the plurality of images.

Furthermore, in the case of the technology disclosed in the above-mentioned Patent Literature, for example, an image in which a face image in which the eyes are opened has been photographed among face images of a person is selected as an optimum image from among a plurality of images obtained by continuous image capture. That is, in the case of the technology of the related art, it is possible to deal with only the data of the face image of a person. As a consequence, it is not possible to deal with many different kinds of subjects other than a person, and it is only possible to select an image in an eyes open state. In other words, captured images desired by a user are of many different kinds, and it is not the case that, for example, the user desires only the image capture of images in an eyes open state.

On the basis of these observations, the present inventors recognized the necessity of being able to even deal with a case in which, for example, a subject is moving, furthermore of being able to deal with a case in which not only a person is used as a subject, but also many other different kinds of subjects are to be photographed, and in addition, of being able to deal with many different kinds of captured images desired by the user.

Then, an image capturing apparatus according to an embodiment includes an image-capturing unit for capturing an image of a subject, an image-capture control unit that controls an image-capturing operation in the image-capturing unit, and a speed detection unit (or device) that detects the movement speed of the subject whose image is being captured by the image-capturing unit. Then, when continuous image capture is being performed by the image-capturing unit, the image-capture control unit dynamically changes and controls the image-capture time interval at the time of continuous image capture in accordance with the movement speed of the subject, the movement speed being detected by the speed detection unit.

Furthermore, an image capturing apparatus according to an embodiment further includes a storage unit that stores a plurality of captured images that are continuously captured by the image-capturing unit; an image analysis unit that analyzes the plurality of captured images stored in the storage unit by using a predetermined analysis algorithm; and an image selection unit that selects at least one captured image from among the plurality of captured images stored in the storage unit on the basis of analysis information produced by the image analysis unit.

A non-transitory image-capture control computer program product according to an embodiment causes a computer of an image capturing apparatus to operate as an image-capture control unit that controls an image-capturing operation of an image-capturing unit so as to cause the relevant image-capturing unit to capture an image of a subject, and a speed detection unit that detects a movement speed of the subject that is being captured by the image-capturing unit. Then, when the image-capturing unit is performing continuous image capture, the image-capture control unit dynamically changes and controls an image-capture time interval at the time of the continuous image capture in accordance with the movement speed of the subject, the movement speed being detected by the speed detection unit.

Furthermore, an image-capture control program according to an embodiment causes the computer of the image capturing apparatus to operate as a storage control unit that causes a storage unit to store a plurality of captured images that have been captured by the image-capturing unit, an image analysis unit that analyzes the plurality of captured images stored in the storage unit by using a predetermined analysis algorithm, and an image selection unit that selects at least one captured image from among the plurality of captured images stored in the storage unit on the basis of analysis information produced by the image analysis unit.

In an image-capture control method according to an embodiment, an image-capture control unit controls an image-capturing operation of an image-capturing unit so as to cause the relevant image-capturing unit to capture an image of a subject, a speed detection unit detects a movement speed of the subject that is being captured by the image-capturing unit, and when the image-capturing unit is performing continuous image capture, the image-capture control unit dynamically changes and controls an image-capture time interval at the time of the continuous image capture in accordance with the movement speed of the subject, the movement speed being detected by the speed detection unit.

Furthermore, in an image-capture control method according to an embodiment, a storage control unit causes a storage unit to store a plurality of captured images that have been captured by the image-capturing unit, an image analysis unit analyzes the plurality of captured images stored in the storage unit by using a predetermined analysis algorithm, and an image selection unit selects at least one captured image from among the plurality of captured images stored in the storage unit on the basis of analysis information produced by the image analysis unit.

A non-transitory recording medium according to an embodiment has recorded thereon an image-capture control program that causes a computer of an image capturing apparatus to operate as an image-capture control unit that controls an image-capturing operation of an image-capturing unit so as to cause the relevant image-capturing unit to capture an image of a subject, and a speed detection unit that detects a movement speed of the subject that is being captured by the image-capturing unit. Then, when the image-capturing unit is performing continuous image capture, the image-capture control unit based on the execution of the image-capture control program recorded on the relevant recording medium dynamically changes and controls an image-capture time interval at the time of the continuous image capture in accordance with the movement speed of the subject, the movement speed being detected by the speed detection unit.

An image-capture control program recorded on a recording medium according to an embodiment causes the computer of the image capturing apparatus to operate as a storage control unit that causes a storage unit to store a plurality of captured images that have been captured by the image-capturing unit, an image analysis unit that analyzes the plurality of captured images stored in the storage unit by using a predetermined analysis algorithm, and an image selection unit that selects at least one captured image from among the plurality of captured images stored in the storage unit on the basis of analysis information produced by the image analysis unit.

That is, according to an embodiment, when the image-capturing unit is performing continuous image capture, by dynamically changing and controlling an image-capture time interval at the time of the relevant continuous image capture in accordance with the movement speed of the subject of the image that is being continuously captured, it is possible to appropriately deal with even a case in which the subject is moving.

Furthermore, according to an embodiment, a plurality of captured images that are continuously captured and stored by the image-capturing unit are analyzed using a predetermined analysis algorithm, and at least one captured image is selected from among the continuously captured images on the basis of the analysis result. As a consequence, for example, it becomes possible to select, for example, various images that seem to be preferable by the user.

As a result, according to an embodiment, it becomes possible to deal with even a case in which, for example, a subject is moving. Furthermore, according to an embodiment, it becomes possible to deal with not only a case in which a person is used as a subject, but also other various subjects. In addition, it becomes possible to deal with many different kinds of captured images that are desired by the user.

BRIEF DESCRIPTION OF DRAWINGS

FIG. 4 illustrates an example of a table indicating the correspondence between areas occupied by each part in an image frame and scores given to each of the parts.

FIG. 8 illustrates an example of a table in which weighting of multiplying by N times (two times) the score of a basic table is performed with respect to items that are input in advance and that match the analysis result of the image.

DESCRIPTION OF EMBODIMENTS

Figure 1:
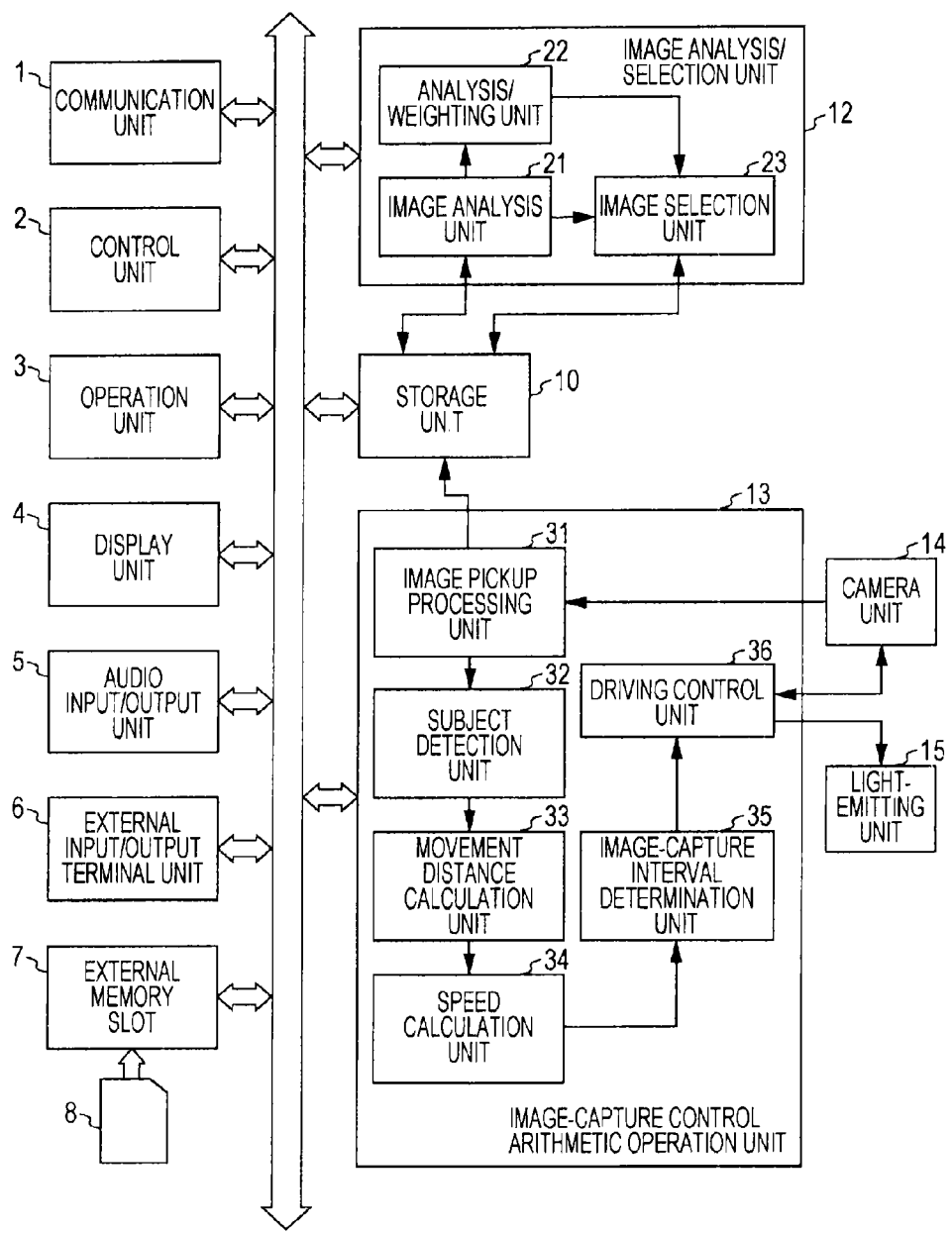
FIG. 1 is a block diagram illustrating a schematic example of the internal overall configuration of a mobile terminal of the present embodiment, the mobile terminal having a camera function.

A description will be given below, with reference to the drawings, of an embodiment of an image capturing apparatus as an embodiment, an image-capture control program product, an image-capture control method, and a recording medium on which the image-capture control program has been recorded. In the present embodiment, as an example of the image capturing apparatus, a mobile terminal having a camera function is given.

[Outline]

The mobile terminal of the present embodiment, though its details will be described later, has functions of detecting, when, for example, a subject that moves at a high speed or whose movement speed varies is to be continuously captured, the movement speed of the subject and the change in the movement speed, and dynamically controlling the image-capture time interval, the number of continuously captured images, and the like at the time of continuous image capture on the basis of the movement speed and the change in the movement speed. As a result, in the mobile terminal of the present embodiment, for example, when a subject that moves at a high speed or whose movement speed changes is continuously captured, the probability that a satisfactory image is obtained among the plurality of images by the continuous image capture is increased. Dynamic image-capture control based on the movement speed and the variation thereof may include, for example, dynamic control of a shutter speed (exposure time) and dynamic control of an aperture.

Furthermore, the mobile terminal of the present embodiment has functions of, for example, checking in advance preferences and favorites of a user by analyzing an image that is input as a best image by the user himself/herself, and selecting images in line with the preferences or orientations of the user when a desired image is to be selected from among the plurality of images by the continuous image capture. As a result, the mobile terminal of the present embodiment is allowed to select not only a satisfactory face image from among a plurality of images by continuous image capture, but also a satisfactory subject image from among a plurality of images in which a subject other than a person is continuously image-captured, and in addition, a captured image that seems to be preferable by the user.

The mobile terminal of the present embodiment is configured to be able to realize the image capture dynamic control and image selection processes by using an algorithm that shows the following outline.

The algorithm of the present embodiment is broadly classified into four processes, namely, "subject detection and speed detection processes", an "image-capture time interval setting determination process", a "subject image part extraction process", and a "best image selection process".

Here, in the present embodiment, the subject detection and speed detection processes include a movement distance calculation process of a subject (object to be image captured), and a speed calculation process for calculating the movement speed of the relevant subject on the basis of the subject movement distance calculated by the relevant movement distance calculation process.

The image-capture time interval determination process is a process for determining an image-capture time interval at the time of the continuous image capture in accordance with the movement speed calculated by the subject detection and speed detection processes.

Furthermore, the subject image part extraction process includes, for example, a process for analyzing an image that is input in advance by a user, a process for analyzing the individual continuously captured images, a process for extracting each part forming the subject in the relevant image by those analyses, and a process for calculating the ratio at which a part occupies in the subject, each of the relevant extracted parts being one of the parts of the subject.

Furthermore, the best image selection process is a process for selecting an image that is determined to be best or better from among the captured images by the continuous image capture by referring to an analysis information table generated on the basis of the analysis of the image that is input in advance on the basis of the analysis result of the images captured by the continuous image capture.

The details of these algorithms and processes will be described later.

[Configuration of Mobile Terminal]

FIG. 1 illustrates a schematic example of the internal overall configuration of a mobile terminal of the present embodiment. The portable terminal of the present embodiment may be any one of, for example, a highly functional mobile phone terminal having a camera function, a tablet terminal, and a digital camera terminal having a communication function.

In FIG. 1, a communication unit 1 includes a communication unit for performing communication through a communication antenna, a portable telephone network, or a public wireless communication network.

An operation unit 3 is constituted by hard keys provided on the housing of the mobile terminal of the present embodiment, a peripheral circuit thereof, a touch panel provided on, for example, the entire surface of the display, and the like. Furthermore, in the case of the present embodiment, the operation unit 3 includes a shutter button for image capture in the camera unit 14. The shutter button is constituted by a hard key that can discriminate between a so-called half pressed state and a so-called fully pressed state. However, the shutter button may be realized as a soft key through the touch panel if it can detect a state that accords with the half pressed state and the fully pressed state.

A display unit 4 includes a display panel formed from, for example, a liquid-crystal panel or an organic EL panel, and a video signal processing circuit for displaying images and the like on the display panel. In the mobile terminal of the present embodiment, in a case where, for example, image capture is being performed by the camera unit 14, a preview image, an image after image capture, and the like are displayed on the relevant display panel. In a case where the operation unit 3 includes a touch panel, the relevant touch panel is set at a size that covers substantially the entire surface of the display panel.

An audio input/output unit 5 includes, for example, a speaker, a microphone, and a circuit for processing an audio signal that is input therefrom or output thereto. The speaker is used for, for example, music reproduction, call reception sound output, and ring alert output. The microphone is used to collect external sound, collect transmitted phone conversation, and others.

An external input/output terminal unit 6 is constituted by a cable connection connector for performing, for example, data communication through a cable, an interface circuit for external data communication, a charging terminal for charging an internal battery through a power cable or the like, and a charging interface circuit therefor, and the like. The mobile terminal of the present embodiment is allowed to obtain, from an external device connected to the relevant external input/output terminal unit 6, various programs and digital, such as an image-capture control program according to the present embodiment, image data that is separately captured, and image data that is input in advance by the user.

An external memory slot 7 is constituted by a memory loading/unloading unit to and from which an external memory 8 formed from a semiconductor storage medium, or the like is loaded/unloaded, an interface circuit for transmitting and receiving data, programs, and the like to and from an external memory loaded into the relevant memory loading/unloading unit. The external memory 8 may also be a recording medium on which the image-capture control program of the embodiment has been recorded. In this case, it is possible for the mobile terminal of the embodiment to obtain an image-capture control program from the relevant external memory 8.

A storage unit 10 is constituted by a built-in memory provided inside this terminal, and a removable card-shaped memory. Examples of the removable card-shaped memory include a card in which so-called SIM (Subscriber Identity Module) information or the like is stored. The built-in memory includes a ROM and a RAM. The ROM is a rewritable ROM. The relevant ROM has stored therein an OS (Operating System), a control program for the control unit 2 (to be described later) to control the whole of the relevant mobile terminal, and each unit thereof, an image-capture control program of the present embodiment, which is executed by an image-capture control calculation unit 13 and an image analysis/selection unit 12 (to be described later), additionally, various types of initialized values, various types of data, and the like. The RAM serves as a work area and a buffer area to store data as desired when the control unit 2, the image-capture control calculation unit 13, and the image analysis/selection unit 12 perform various data processing.

The control unit 2, which is formed of a main CPU (center processing unit), controls each unit, such as the communication unit 1, the display unit 4, the audio input/output unit 5, the external input/output terminal unit 6, the external memory slot 7, the image-capture control calculation unit 13, and the image analysis/selection unit 12, and performs various arithmetic operations. The relevant control unit 2 executes the control program and the like stored in the storage unit 10. The execution of the image-capture control program of the present embodiment may be carried out by the control unit 2.

The mobile terminal of the present embodiment, though its illustration is omitted in FIG. 1, of course, includes components provided in a typical mobile terminal, such as a clock unit for measuring a time period and time, a battery for supplying power to each unit, a power management IC for controlling power, a digital broadcast receiving module for receiving a digital television broadcast and a digital radio broadcast, for example, a non-contact communication module for performing non-contact communication, which is used for so-called RFID (Radio Frequency-Identification), a non-contact IC card, and the like, a GPS module for obtaining the latitude and the longitude of the current position of its own terminal by using a GPS signal from a GPS (Global Positioning System) geodetic satellite, short-distance wireless communication units of a wireless LAN, Bluetooth (registered trademark), or the like, various sensor units, such as, for example, an inclination sensor, an acceleration sensor, a direction sensor, a temperature sensor, a humidity sensor, and an illumination sensor.

The camera unit 14 includes an image-capturing element for capturing a still image and a moving image, an optical system for forming a subject image in the image-capturing element, an auto-focus mechanism for driving lenses of the optical system so as to perform automatic focusing, an auto-iris mechanism for driving the aperture of the optical system so as to perform automatic aperture adjustment, a shutter speed adjustment mechanism for adjusting a shutter speed by means of a mechanical, electronic, or other type, a camera-shake correction mechanism for correcting so-called camera shake, and a driving circuit for driving those mechanisms.

A light-emitting unit 15 includes a lighting unit formed of an LED for emitting image-capturing illumination light (for example, strobe light) for illuminating a subject at the time of image capture by the camera unit 14 or image-capturing auxiliary light for obtaining necessary brightness for the purpose of auto-focus, and a light-emission driving circuit for driving the lighting unit to emit light.

The image-capture control calculation unit 13 is configured to include an image pickup signal processing unit 31, a driving control unit 36, a subject detection unit 32, a movement distance calculation unit 33, a speed calculation unit 34, and an image-capture interval determination unit 35, and causes those units to operate under the control of the control unit 2.

The image pickup signal processing unit 31 generates image data from the image pickup signal output by the image-capturing element of the camera unit 14, sends the image data to the control unit 2 as necessary, and sends the image data to the storage unit 10 as necessary, whereby the image data is stored.

The driving control unit 36 controls the driving circuit for each of the above-mentioned mechanisms of the camera unit 14, thereby causing the relevant camera unit 14 to perform the image-capturing operation of the image-capturing element, the automatic focusing operation of the auto-focus mechanism, the automatic aperture adjustment operation of the auto-iris mechanism, the shutter speed adjustment operation of the shutter speed adjustment mechanism, the camera-shake correction operation of the camera-shake correction mechanism, and the like. Furthermore, the driving control unit 35 controls the light-emission driving circuit of the light-emitting unit 15, thereby causing the relevant light-emitting unit 15 to perform the light emission operation of the image-capturing illumination light and the light emission operation of the image-capturing auxiliary light.

Various algorithms are known as an auto-focus control algorithm when the automatic focusing is to be performed, an aperture control algorithm at the time of the automatic aperture adjustment, a shutter speed control algorithm at the time of the automatic shutter speed adjustment, an auto white-balance control algorithm at the time of the white-balance setting, a camera-shake correction control algorithm at the time of camera-shake correction, or the like. The image-capture control calculation unit 13 can use any one of the algorithms.

In the case of the present embodiment, for the auto-focus control algorithm, as an example, a control algorithm that brings the focus of the optical system to a direction in which the contrast of the image portion in a predetermined focus area within the image captured by the camera unit 14 is high. The relevant predetermined focus area, as an example, is set as a substantially central area of the screen, an area that is set as desired by the user through the operation unit 3, a subject area extracted by detection of a contour (edge) in the image, a subject area that is detected by recognizing various predetermined subject patterns, such as, for example, the face of a person or the shape of an animal, from within the image.

Furthermore, for the aperture control algorithm and the shutter speed control algorithm, as an example, a control algorithm that optimizes the aperture value and the shutter speed on the basis of the luminance information of the captured image of the camera unit 14 is used.

For the white-balance control algorithm, as an example, a control algorithm is used which optimizes white balance by judging the color temperature of the light source on the basis of the captured image of the camera unit 14 or on the basis of the information on the light source that is set by the user or the information on the color temperature.

As the camera-shake correction control algorithm, a control algorithm is used which detects, for example, the deflection direction, the deflection, the deflection speed, the deflection acceleration, and the like of the mobile terminal of the present embodiment, which causes the lenses or the image-capturing elements of the optical system to be moved in a direction that cancels those deflections, or that changes the area of reading from the image-capturing element, or the like.

Of course, the above-mentioned control algorithms are only examples, and the present invention is not limited to these examples. In the present embodiment, the automatic focusing operation, the automatic aperture adjustment operation, the automatic shutter speed setting operation, the auto white-balance setting operation, and the like based on those respective control algorithms will be represented collectively as an "image-capture control value setting operation".

When the operation mode of the mobile terminal of the present embodiment is switched to an image-capture mode, the image-capture control calculation unit 13 that includes the above-mentioned individual components and can execute the individual control algorithms causes the camera unit 14 to be started up by the driving control unit 36 so as to enter a state in which image capture is possible.

At this time, an image pickup signal is output at a predetermined frame rate from the camera unit 14, and the image pickup signal is sent to the image pickup signal processing unit 31. The relevant image pickup signal processing unit 31 generates moving image data from the image pickup signal at the frame rate.

The relevant moving image data is sent to the display unit 4 and is displayed on the display screen under the control of the control unit 2. That is, at this time, on the display screen, a preview video before the shutter button is pressed is displayed.

Furthermore, in the relevant image-capture mode, when the shutter button is placed in a half pressed state, a signal to that effect is sent to the image-capture control calculation unit 13 from the control unit 2.

When the half pressed signal of the shutter button is received, on the basis of the image pickup signal from the camera unit 14, the image-capture control calculation unit 13 causes an automatic focusing operation based on the auto-focus control algorithm to be started. Furthermore, the image-capture control calculation unit 13 at this time obtains in advance image-capture control values, such as an aperture value, a shutter speed value, a white-balance value, and the like, when the shutter button is fully pressed and image capture is performed at a later time, and furthermore obtains in advance a light-emission control value of the light-emitting unit 15 as necessary.

Then, when the shutter button is fully pressed, the signal to that effect is sent to the image-capture control calculation unit 13 from the control unit 2.

When the fully pressed signal of the relevant shutter button is received, the image-capture control calculation unit 13 controls the driving control unit 36 so as to drive the camera unit 14, so that image capture using the shutter speed, the aperture value, and the like is performed.

Here, in the present embodiment, for the image-capture mode, at least a still image-capture mode and a moving image-capture mode have been prepared, and in addition, for the still image-capture mode, at least a normal image-capture mode, a continuous image capture mode, and a continuous image capture mode for selecting a best image have been prepared.

These image-capture modes are examples, and additionally, various image-capture modes may also be prepared.

The still image-capture mode is a mode for capturing a so-called still image, and the moving image-capture mode is a mode for capturing a so-called moving image.

The normal image-capture mode among the still image-capture modes is a mode in which when the shutter button is in a half pressed state, image-capture control values, such as the in-focus position, the aperture value, the shutter speed value, and the white-balance value in the above-mentioned image-capture control value setting operation, are set, and when the shutter button is placed in a fully pressed state, image capture of one image based on the set image-capture control values is performed and the captured image is stored.

The continuous image capture mode among the still image-capture modes is a mode in which when the shutter button is in a half pressed state, the individual image-capture control values are set by the above-mentioned image-capture control value setting operation, continuous image capture is performed only while, after the shutter button is placed in a fully pressed state, the fully pressed state is continued, the continuous image capture is stopped when the shutter button is made open, and those individual continuously captured images are stored.

The image-capture time interval of individual continuously photograph images in the relevant continuous image-capture mode, that is, the time interval from when one still image is captured until the next one still image is captured in continuous image capture, is set as, for example, a fixed time interval that has been preset as desired by the user or as a fixed time interval that has been initialized in advance in the mobile terminal. Furthermore, image-capture control values when image capture of each still image is to be performed at the time of the relevant continuous image capture may be set as, for example, image-capture control values that are set when the shutter button is in a half pressed state, or in each of intervals between image captures performed by continuous image capture (for example, a period in which image capture is not performed), the image-capture control values may be set.

The continuous image-capture mode for selecting a best image among the still image-capture modes is a mode in which, when the shutter button is in a half pressed state, the individual image-capture control values are set by the above-mentioned image-capture control value setting operation and also continuous image capture is performed, the individual captured images by the continuous image capture are temporarily stored in a memory, and, when, after that, the shutter button is placed in a fully pressed state and the image capture is completed, the continuously captured images stored in the temporary storage are stored in a non-volatile memory.

When the shutter button is placed in a fully pressed state, all the continuously captured images that are temporarily stored in the memory at the time of the half pressed state may be stored in a non-volatile memory, and continuously captured images within a certain time period range may be stored therein when the shutter button is placed in the fully pressed state. It is preferable that the certain time period range is a time range before a time period, which includes at least the fully pressed point in time, with respect to the point in time at which the fully pressed state is reached. However, of course, a time range containing both times before and after the fully pressed point in time, that is, the combination of before and after the fully pressed point in time, may be set as a certain time period range. Furthermore, the temporary memory and the non-volatile memory may be provided in the storage unit 10 and, for example, only the temporary memory may be provided in the image-capture control calculation unit 13. Furthermore, the image-capture control values at the time of the continuous image capture in the relevant continuous image-capture mode for selecting a best image may be set, for example, at the first time the shutter button is placed in a half pressed state, and also may be set, for example, in each of intervals between image captures performed by continuous image capture (for example, a period during which no image capture is being performed).

In the case of the continuous image-capture mode for selecting a best image, when the shutter button is placed in a half pressed state, the image-capture control calculation unit 13 detects a subject from the images that are continuously captured by the camera unit 14, calculates the movement speed thereof and the variation of the relevant movement speed when the relevant subject is moving, and can thereby dynamically change and control the continuous image-capture time interval and the number of continuously captured images during the continuous image capture in the shutter button half pressed state in accordance with the movement speed and a variation in the movement speed.

In order to realize these operations, the image-capture control calculation unit 13 of the mobile terminal of the present embodiment is configured to include a subject detection unit 32, a movement distance calculation unit 33, a speed calculation unit 34, and an image-capture interval determination unit 35. The subject detection unit 32, the movement distance calculation unit 33, the speed calculation unit 34, and the image-capture interval determination unit 35 may be configured using software, using hardware, and may also be configured in such a manner that software and hardware are used in combination as appropriate.

The subject detection unit 32 detects a subject from the image pickup signal of the camera unit 14. Regarding the relevant subject detection algorithm, various algorithms are considered. In the present embodiment, any one of those algorithms can be used. In the case of the present embodiment, for the subject detection algorithm, as an example, an algorithm that detects a contour (edge) of an image captured by the camera unit 14 and that detects an image portion corresponding to the subject in the relevant captured image on the basis of the detected contour information is used.

Figure 2:
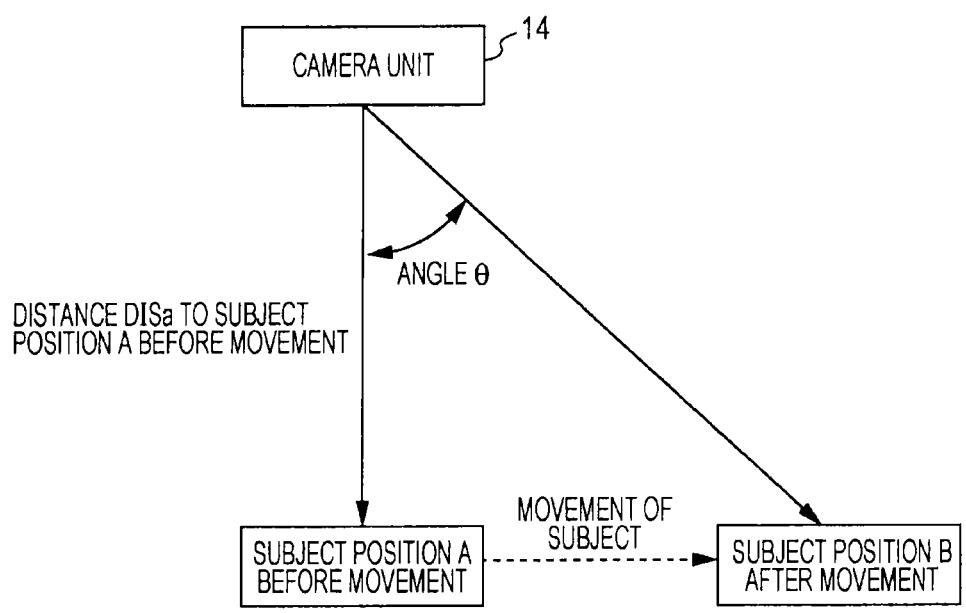
FIG. 2 is a view for use in an illustration of an example of the calculation of a subject movement distance, which is based on a distance from a subject to a camera and an angle formed between subject positions before and after movement.

The movement distance calculation unit 33 calculates a distance that is moved by the subject detected by the subject detection unit 32 within the unit time period. In the case of the present embodiment, as shown in FIG. 2, as an example, the movement distance calculation unit 33 obtains a distance DISa from the subject to the relevant camera unit 14 on the basis of the focal length information, obtains an angle θ formed between the subject position A before movement and the subject position B after movement, and calculates the movement distance by an arithmetic operation of the equation (1) below using the distance DISa and the angle θ.

$$\text{The movement distance from } A \text{ to } B = DISa \cdot \tan \theta \quad (1)$$

The relevant movement distance calculation algorithm is only an example, and in the embodiment, other various movement distance calculation algorithms can be used.

The speed calculation unit 34 obtains the movement speed of the subject and the variation in the speed on the basis of the movement distance calculated by the movement distance calculation unit 33. That is, the speed calculation unit 34 calculates a speed and a variation in the speed on the basis of the distance moved by the subject per unit time period.

The image-capture interval determination unit 35 dynamically determines the continuous image-capture time interval and the number of continuously captured images during continuous image capture in the shutter button half pressed state in accordance with the speed and the variation in the speed, which are obtained by the speed calculation unit 34.

Specifically, for example, when the movement speed is high, the continuous image-capture time interval is determined to be a short continuous image-capture time interval, and conversely, when the movement speed is low, the continuous image-capture time interval is determined to be a long continuous image-capture time interval. In addition, when the movement speed is varied, the continuous image-capture time interval can be changed as appropriate in accordance with the variation thereof. Furthermore, for example, when the movement speed is high, the number of continuously captured images is increased, and when, conversely, the movement speed is low, the number of continuously captured images is decreased. In addition, when the movement speed is varied, the number of continuously captured images can be changed as appropriate in accordance with the variation thereof. Of course, the number may be determined in the opposite way.

Then, the information on the continuous image-capture time interval and the number of continuously captured images that are dynamically determined by the image-capture interval determination unit 35 are sent to the driving control unit 36. The driving control unit 36 at this time causes continuous image capture in the camera unit 14 to be performed at the continuous image-capture time interval and at the number of continuously captured images, which are dynamically determined.

That is, in the continuous image-capture mode for selecting a best image, the mobile terminal of the present embodiment can dynamically change and control the continuous image-capture time interval and the number of continuously captured images when the shutter button is placed in a half pressed state in accordance with the movement speed of the subject captured by the camera unit 14 and the variation in the speed.

Furthermore, the mobile terminal of the present embodiment also includes an image analysis/selection unit 12 that can automatically select a best or better image on which, for example, hobbies, preferences, and feelings of the user are reflected from among, for example, a plurality of images that are continuously captured and stored during the continuous image-capture mode for selecting a best image.

The image analysis/selection unit 12 is configured to include an image analysis unit 21, an analysis/weighting unit 22, and an image selection unit 23.

The image analysis unit 21 includes at least two functions, namely, a function of generating analysis information indicating features of the image, which are preferable or favored by the user and holding the analysis information as a table by analyzing an image, such as a photograph, which is input in advance, and a function of similarly analyzing each image obtained by the continuous image capture during the continuous image-capture mode for selecting a best image and outputting the analysis result thereof to the image selection unit 23. For the image that is input in advance to the relevant image analysis unit 21, for example, an image prestored in the storage unit 10, an image stored in the memory 8 loaded into the external memory slot 7, an image received through the external input/output terminal unit 6, an image obtained by data communication or the like through the communication unit 1, and the like are considered.

The image analysis algorithm in the relevant image analysis unit 21 may be any one of the various algorithms. In the case of the present embodiment, the relevant image analysis unit 21, as an example, uses an analysis algorithm that detects the contour (edge) of the image, detects, for example, the main part of the image on the basis of the contour, additionally detects sub-parts accompanying the relevant main parts, and converts each of the detected parts into a numerical value (score).

For example, as an example of the image analysis, in a case where the analysis target image is an image of a dog, the image analysis unit 21 detects each part, as shown in FIGS. 3A-E.

Figure 3A:
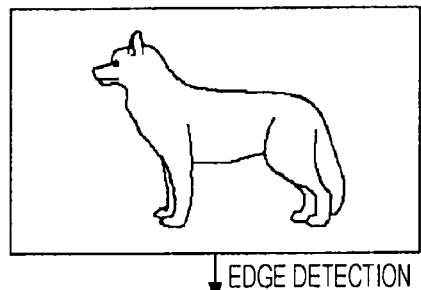
FIG. 3A is a view for use in an illustration of outline of an analysis process for a relevant image in a case where the image to be analyzed is an image of a dog.
Figure 3B:
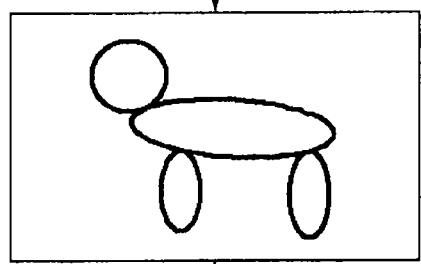
FIG. 3B illustrates an example of edge detection for use in an illustration of outline of an analysis process for a relevant image.

That is, in a case where the analysis target image is an image in which a dog is photographed from the horizontal direction, as shown in FIG. 3A, first, the image analysis unit 21 detects the contour (edge) of the image of the relevant dog, as shown in FIG. 3B.

Figure 3C:
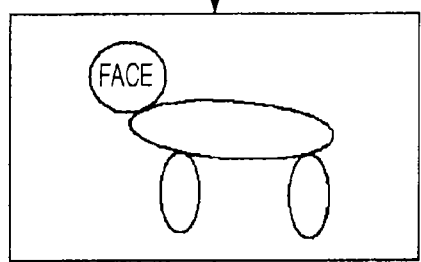
FIG. 3C illustrates an example of face recognition for use in an illustration of outline of an analysis process for a relevant image.

Next, as shown in FIG. 3C, the image analysis unit 21 detects a face (head part) part as a main part from the detected contour by using, for example, a dog face detection technology.

Figure 3D:
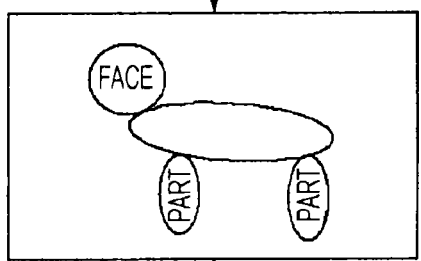
FIG. 3D illustrates an example of protruding part detection for use in an illustration of outline of an analysis process for a relevant image

Next, as shown in FIG. 3D, the image analysis unit 21 detects protruding parts excluding the face part from the detected contour, and detects the relevant detected protruding part as sub-parts accompanying the main part.

Figure 3E:
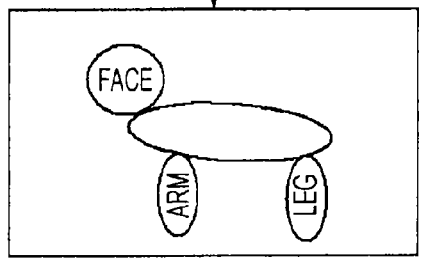
FIG. 3E illustrates an example of part estimation for use in an illustration of outline of an analysis process for a relevant image.

Then, as shown in FIG. 3E, the image analysis unit 21 detects a part whose distance from the face part is smaller among the protruding parts as an arm (hand, front leg) part and detects a part whose distance is larger among the protruding parts as a leg (foot, rear leg) part.

In the example of FIGS. 3A-E, an image of a dog is given as an analysis target image. In the image analysis unit 21 of the present embodiment, the analysis target image may be an image of various animals other than a person and a dog, and furthermore may be an image of various object bodies, such as an automobile, an airplane, a bicycle, and an autobicycle. In a case where the analysis target image is, for example, an automobile image, analysis is possible such that the front unit, the front wheel unit, the rear wheel unit, and the like of the relevant automobile are used as parts, in a case where the analysis target image is an image of an airplane, the plane nose unit, the main wing part, the tail wing unit, and the like of the relevant airplane are used as parts, and in a case where the analysis target image is an image of a bicycle or an autobicycle, the handle unit, the front wheel unit, the rear wheel unit, and the like thereof are used as parts.

Furthermore, as an example of conversion-into-numerical-value of each of the parts, in a case where the analysis target image is, for example, various images described above, such as an animal or a person, the image analysis unit 21 gives a score to each of the parts that are detected as described above. In the case of the present embodiment, for the score given to each part, a value corresponding to the area in which each of the those parts occupies in the frame of the image, or the like is considered.

FIG. 4 illustrates, as an example, an example of a table in which parts obtained by analyzing an image that is input in advance, and scores that are given for each part are registered.

In the case of this example of the table of FIG. 4, an example is given in which, regarding face parts, score 6 is given when the occupied area of the face part is greater than or equal to 10% of the image frame, score 4 is given when it is in a range of 10% to 5%, score 2 is given when it is smaller than or equal to 5%, and no score is given when there is no face part (occupied area is 0%) in the image frame (0 score is given). Hereinafter, in a similar manner, an example is given in which, regarding, for example, arm parts, score 3 is given when the occupied area thereof is greater than or equal to 10% of the image frame, score 2 is given when the occupied area thereof is in a range of 10% to 5%, score 1 is given when the occupied area thereof is less than 5%, and no score is given when there is no arm part (occupied area: 0%). Furthermore, regarding, for example, leg parts, when the occupied area thereof is greater than or equal to 10% of the image frame, score 3 is given when the occupied area thereof is in a range of 10% to 5%, score 1 is given when the occupied area thereof is less than 5%, and no score is given when there is no arm part (occupied area: 0%).

The table shown in FIG. 4 and the scores that are given to each part are only an example, and the present invention is not limited to this example.

The image selection unit 23 of the image analysis/selection unit 12 is a component for automatically selecting an image that is considered to be preferable or favored by the user from among a plurality of images that are captured by the continuous image capture and stored in the continuous image-capture mode for selecting a best image.

The selection algorithm used when the image selection unit 23 selects any image from among the continuously captured images may be any one of the various algorithms.

In the case of the present embodiment, as an example, the relevant image selection unit 23 uses a selection algorithm that selects any image by referring to the table on the basis of the analysis results obtained by the image analysis unit 21 by analyzing the continuously captured images.

In the present embodiment, as an example, in a case where continuously captured images in which a dog approaches while running during the continuous image-capture mode for selecting a best image are captured, and furthermore, the image that has been input in advance and analyzed is, for example, an image shown in FIG. 3 above, the image selection unit 23 selects one image that seems to be preferable or favored by the user from among the continuously captured images in the following manner.

For example, in a case where, as an image that is preferable or favored by the user, an image such as that shown in FIG. 3 above, in which a dog is photographed from the side, has been input in advance, and the image has been analyzed, the relevant image of FIG. 3 is an image in which a dog is photographed from the side. Consequently, a table that is obtained from the analysis result thereof is information in which scores are given to face (head part) parts, arm (front leg) parts, and leg (rear leg) parts, correspondingly, as shown in FIG. 4 above.

Figure 5:
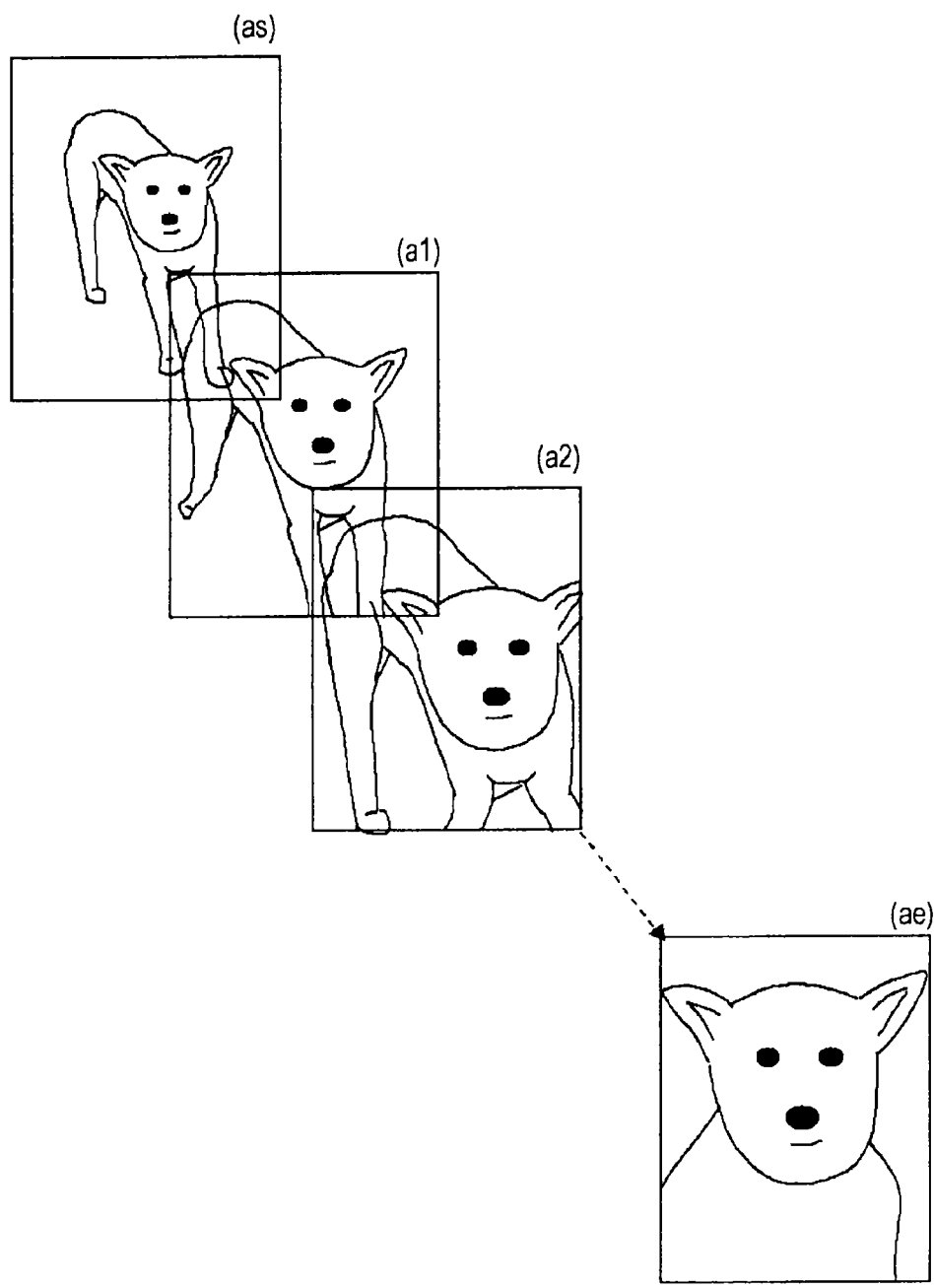
FIG. 5 illustrates an example of continuously captured images when the mobile terminal according to the present embodiment is in a continuous image capture mode for selecting a best image.

Here, as an example, it is assumed that the continuously captured images during the continuous image-capture mode for selecting a best image are continuously captured images in which a dog approaches while running as shown in FIG. 5. The image at the initial time of the image capture is an image in which the entire physical body on the substantially front side of the dog is photographed as in (as) of FIG. 5. After that, as in (a1) and (a2) of FIG. 5, the relevant dog gradually approaches, and finally, for example, the dog comes nearby and the dog's face occupies substantially the whole of the screen, as shown in (ae) of FIG. 5.

Figure 6A:
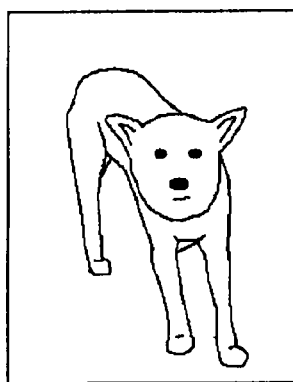
FIG. 6A is a view for use in a schematic illustration of, for example, an image of (as) in FIG. 5 among the continuously captured images of FIG. 5.
Figure 6B:
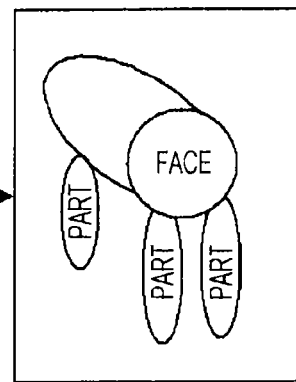
FIG. 6B is a view illustrating each part obtained by analyzing the image of FIG. 6A.
Figure 7A:
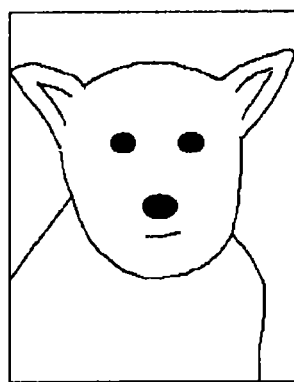
FIG. 7A is a view for use in a schematic illustration of, for example, an image of (ae) in FIG. 5 among the continuously captured images of FIG. 5.
Figure 7B:
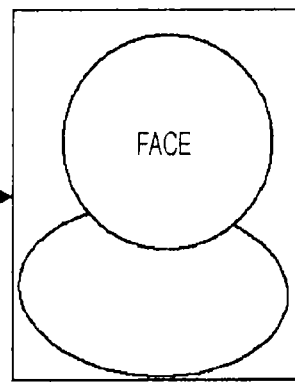
FIG. 7B is a view illustrating each part obtained by analyzing the image of FIG. 7A.

In a case where an image that is considered to be desired by the user is to be automatically selected from among such continuously captured images, first, the image analysis/selection unit 12 of the present embodiment causes the image analysis unit 21 to analyze the individual images obtained by the continuous image capture, detects each part for each of those images, and gives a score by referring to the table with regard to each of those images. FIG. 6A illustrates an image representing the (as) image of FIG. 5 and FIG. 6B illustrates a contour of each part of the (as) image, obtained by analyzing the (as) image. Furthermore, FIG. 7A illustrates an image representing the (ae) image of FIG. 5 and FIG. 7B illustrates a contour of each part of the (ae) image, obtained by analyzing the (ae) image.

Next, when analysis of each of the images, which is performed by the image analysis unit 21, is completed, the image selection unit 23 receives the analysis information of each image from the relevant image analysis unit 21, and selects, for example, one image from among the continuously captured images on the basis of the analysis information. That is, in the case of the present embodiment, the image selection unit 23 refers to the table of FIG. 4 above so as to calculate the score for each part of the continuously captured images, and selects, for example, the image with the highest score.

A description will be given by taking examples of FIGS. 6A and 6B and 7A and 7B. In the case of the image of FIG. 6B, one face part, two arm (front leg) parts, and one leg (rear leg) part are obtained as a result of the analysis. Furthermore, in the case of the image of FIG. 6B, the area that one face part occupies in the relevant image frame is in a range of 10% to 5%, the area that each of the two arm (front leg) parts occupies in the relevant image frame is each smaller than or equal to 5%, and the area that one leg (rear leg) parts occupies in the relevant image frame is smaller than or equal to 5%. Consequently, in the image of FIG. 6B, the total of scores of each part is obtained in accordance with the arithmetic operation of the equation (2) below. Mp in equation (2) is score "4" of the face part when the occupied area in the image frame is in a range of 10% to 5%, Sp1 is score "1" of the arm (front leg) part when the occupied area in the image frame is smaller than or equal to 5%, and Sp2 is score "1" of the leg (rear leg) part when the occupied area in the image frame is smaller than or equal to 5%.

$$Mp \times 1 \times 2 + (Sp1 \text{ or } Sp2) \times 3 \times 2 = 8 + 12 = 20 \quad (2)$$

On the other hand, in the case of the image of FIG. 7B, only one face part is obtained as a result of the analysis. Furthermore, in the case of the image of FIG. 7B, the area in which one face part occupies in the relevant image frame is greater than or equal to 10%. Consequently, in the image of FIG. 7B, the total of scores of each part is obtained in accordance with the arithmetic operation of equation (3) below. Mp in equation (3) is score "6" of the face part in which the occupied area in the image frame is greater than or equal to 10.

$$Mp \times 1 = 6 \quad (3)$$

That is, in the case of this example, on the basis of the score "20" obtained from the image of FIG. 6B and the score "6" obtained from the image of FIG. 7B, the image selection unit 23 of this example selects the image of FIG. 6B having a larger score. The above-mentioned example is only an example.

Furthermore, in the present embodiment, for example, when each image obtained by the continuous image capture during the continuous image-capture mode for selecting a best image is to be analyzed, it is possible to perform predetermined weighting when a score is to be given to a part that matches the analysis result of the image that was input in advance.

The relevant weighting is performed, as an example, by a process for adding, multiplying, subtracting, or dividing a predetermined value to, by, from, or by each score of a basic table that is generated on the basis of the above-mentioned image that was input in advance, or by a process in which a plurality of tables in which a different score is given to each part are separately prepared in advance, and one of the tables is selectively used from among those tables.

As a component for such weighting, the image analysis/selection unit 12 of the mobile terminal of the present embodiment includes an analysis/weighting unit 22.

FIG. 8 illustrates an example of a table in which weighting of multiplying by N times (in the example of FIG. 8, N=two times) the score of the basic table is performed when a part item of the basic table based on an image input in advance match a part item obtained by analyzing the continuously captured image during the continuous image-capture mode for selecting a best image. In a case where an example of the table of FIG. 8 is used, the calculation of the score regarding the image of FIG. 6B is an arithmetic operation such as equation (4) below. Mp, Sp1, and Sp2 in equation (4) are identical to those of equation (2) above.

$$Mp+(Sp1 \text{ or } Sp2) \times 3 = 8+12 = 20 \quad (4)$$

In a case where the example of the table of FIG. 8 is used, the calculation of the score with regard to the image of FIG. 7B is identical to that of equation (3) above.

Also, in a case where this example of the table of FIG. 8 is used, the image selection unit 23 selects the image of FIG. 6B having a larger score from among the score "20" obtained from the image of FIG. 6B and the score "6" obtained from the image of FIG. 7B.

Furthermore, in the present embodiment, the weighting by the analysis/weighting unit 22 may be adjusted in accordance with, for example, the continuous image-capture time interval and the number of continuously captured images that are determined at the time of the continuous image capture of the continuous image-capture mode for selecting a best image.

For example, in a case where the continuous image-capture time interval is shortened because the movement speed of the subject is high, adjustments are considered in which the scores of the basic table are multiplied by n with regard to, for example, arm (front leg) parts or leg (rear leg) parts. In this case, when, for example, a dog of a subject is running very fast, it becomes possible to select, for example, an image in which the front legs and the rear legs that are moving fast are clearly photographed or an image in which a jumping dog is photographed at the relevant jumping timing.

Alternatively, in a case where, for example, the movement speed of the subject is slow and the continuous image-capture time interval is increased, an adjustment is considered in which the scores of the basic table are multiplied by m with regard to, for example, the items of the face parts. In this case, when, for example, the dog which is the subject is walking slowly, it becomes possible to select, in particular, an image in which the face is brought into focus and is beautifully photographed.

Of course, these are only examples, and the present invention is not limited to these. Furthermore, N times, n times, and m times at the time of the weighting may each be not only a positive number, but also a negative number or a number with a fractional part.

In addition, the table can be set in accordance with the analysis of an image that is input in advance, and may also be provided as an initial table in advance, for example, the table can be formed in such a manner that the user sets each item (each part) and a score as desired. Furthermore, the table may be updated by learning the analysis results of images that were captured by the user in the past. In this case, it becomes possible to select an image that better matches the preference or the like of the user as a result of image capture being continued over a long period of time and learning information of each part item and scores being stored.

[Flowcharts]

Flowcharts when the mobile terminal of the present embodiment executes image-capture control programs of the present embodiment, which include algorithms, such as the above-mentioned "subject detection and speed detection processes", "image-capture time interval setting determination process", "subject image part extraction process", "best image selection process", and the like, will be illustrated below. In the case of the present disclosure, the processing of the following flowcharts is realized by executing the image-capture control program of the present embodiment by the image-capture control calculation unit 13 and the image analysis/selection unit 12. In the present embodiment, as a result of executing the relevant image-capture control program, each function of the image-capture control calculation unit 13 and the image analysis/selection unit 12 is realized. The functions involved with execution of the image-capture control programs of the present embodiments may be realized by the control unit 2.

Figure 9:
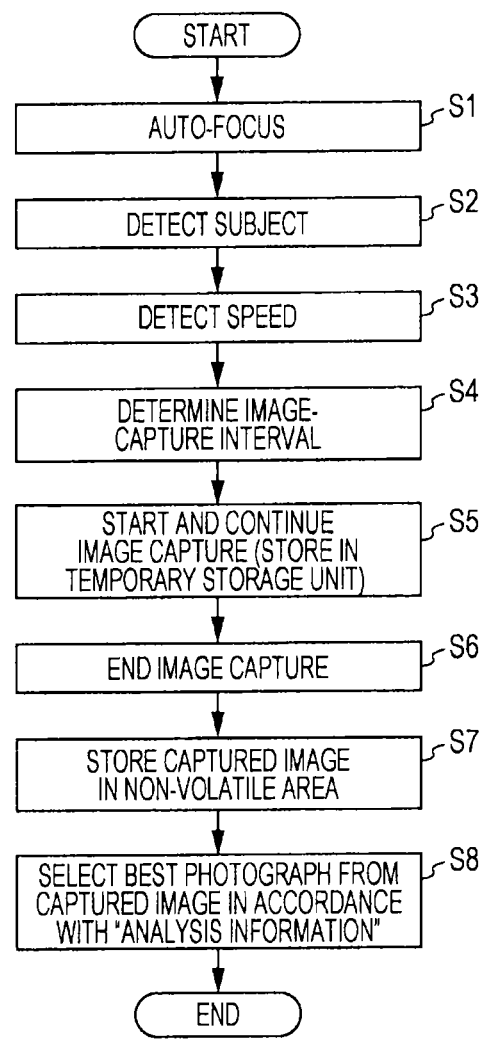
FIG. 9 is a flowchart illustrating the overall flow from when an image-capture control program of the present embodiment is executed until and continuous image capture is performed in the continuous image capture mode for selecting a best image until a best image is selected from among the relevant continuously captured images.

FIG. 9 illustrates the overall flow from when the image-capture control program of the present embodiment is executed and the continuous image capture is performed in the continuous image-capture mode for selecting a best image until the best image is selected from among a plurality of images that are obtained by relevant continuous image capture and is stored by the relevant continuous image-captures.

In the flowchart shown in FIG. 9, the mobile terminal of the present embodiment is placed in the continuous image-capture mode for selecting a best image. When the shutter button of the operation unit 3 is placed in a half pressed state, the image-capture control calculation unit 13, in a process of step S1, controls the driving control unit 36, thereby causing the camera unit 14 to perform an auto-focus operation.

When the auto-focus operation is started, in a process of step S2, the subject detection unit 32 detects a contour (edge) in the manner described above from the captured image that has been captured by the camera unit 14 and has been sent through the image signal processing unit 31, and detects an image portion corresponding to the subject in the relevant captured image on the basis of the contour information. The information of the subject detected by the relevant subject detection unit 32 is passed to the movement distance calculation unit 33. Furthermore, at the same time, information on the focal length when focus is made by the auto-focus operation is passed to the movement distance calculation unit 33 from the camera unit 14.

Next, in a process of step S3, the movement distance calculation unit 33, as described above, calculates the movement distance of the subject on the basis of the distance information up to the subject corresponding to the focal length and the angle formed by the subject positions before and after movement. Furthermore, at this time, the speed calculation unit 34 calculates the movement speed of the subject in the manner described above on the basis of the information movement distance calculated by the movement distance calculation unit 33. Then, the movement speed information of the relevant subject is passed to the image-capture interval determination unit 35.

Next, in a process of step S4, on the basis of the information on the movement speed, the image-capture interval determination unit 35 determines the continuous image-capture time interval and the number of continuously captured images at the time of continuous image capture, which is being performed in the shutter button half pressed state. Then, in a process of step S5, on the basis of the continuous image-capture time interval and the number of continuously captured images, the image-capture interval determination unit 35 controls the driving control unit 36 so as to perform continuous image capture at the relevant continuous image-capture time interval and furthermore perform continuous image capture of the number of continuously captured images.

As a result, the continuous image-capture time interval and the number of continuously captured images when the shutter button is placed in a half pressed state are dynamically changed in accordance with the movement speed of the subject.

Then, after that, when, for example, the shutter button is fully pressed, the image-capture control calculation unit 13, in a process of step S7, ends the continuous image capture, and stores each image information obtained by the relevant continuous image capture in a non-volatile memory.

In a case where the shutter button is not fully pressed even when a certain time period has passed from when the shutter button was placed in a half pressed state, the image-capture control calculation unit 13 temporarily resets the movement distance calculation, the movement speed calculation, the image-capture time interval determination process, and the like. After that, the image-capture control calculation unit 13 newly performs those processes. As a result, the determination of an image-capture time interval and the like, which better match the actual motion of the subject at the current point in time, becomes possible.

After that, in a process of step S8, the image analysis/selection unit 12 performs the above-mentioned image analysis the image analysis unit 21 with regard to each image that is continuously captured and stored during the continuous image-capture mode for selecting a best image, and performs image analysis in which the above-mentioned weighting has been performed using the analysis/weighting unit 22 as necessary.

Then, when the image analysis regarding all the images that were continuously captured is completed, the image selection unit 23 automatically selects a best image desired by the user from among those continuously captured images on the basis of those pieces of analysis information and the information of the table.

Figure 10:
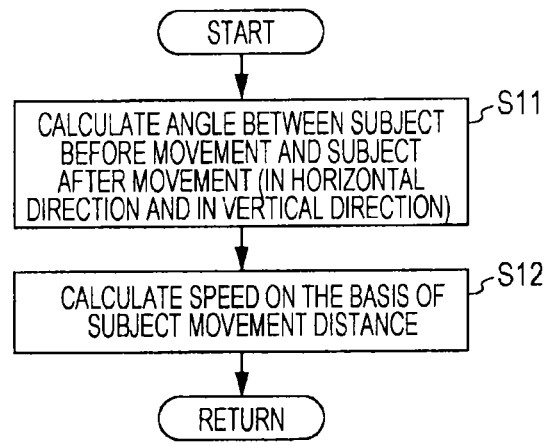
FIG. 10 is a detailed flowchart of calculating the movement distance and the movement speed in step S3 of FIG. 9.

FIG. 10 illustrates a detailed flowchart of calculating the movement distance and the movement speed in step S3 of FIG. 9.

In this flowchart of FIG. 10, first, in a process of step S11, the movement distance calculation unit 33 obtains the distance from the subject to the camera unit 14 on the basis of the focal length information obtained from the auto-focus mechanism of the camera unit 14, and also calculates the angle formed between the subject position before movement and the subject position after movement in the manner described above.

Next, in a process of step S12, the movement distance calculation unit 33 calculates the movement distance of the relevant subject on the basis of the distance up to the subject and the angle formed between the subject positions before and after the movement, and passes the movement distance to the speed calculation unit 34.

The speed calculation unit 34 obtains the movement speed of the subject on the basis of the calculated movement distance. Then, the relevant speed calculation unit 34 passes the information on the movement speed to the image-capture interval determination unit 35.

Figure 11:
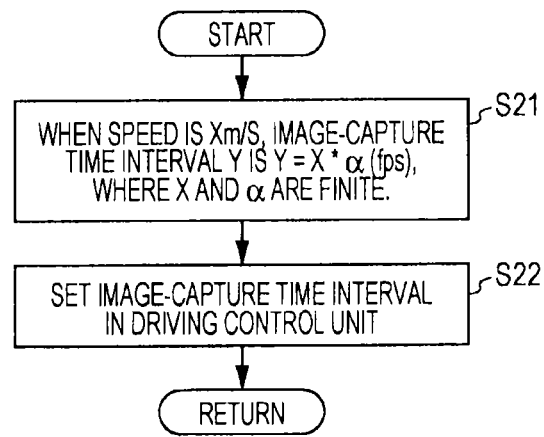
FIG. 11 is a detailed flowchart of an image-capture interval determination process in step S4 of FIG. 9.

FIG. 11 illustrates a detailed flowchart of an image-capture interval determination process in step S4 of FIG. 9.

In this flowchart of FIG. 11, in a process of step S21, the image-capture interval determination unit 35 determines an image-capture time interval in accordance with the arithmetic operation of equation (5) below using the movement speed information. X in equation (5) denotes a movement speed (m/s), Y denotes an image-capture time interval, and α denotes a predetermined coefficient. X and α described above are finite values.

$$Y = X * \alpha \tag{5}$$

That is, as a result of the arithmetic operation of this equation (5) being performed in sequence, the image-capture time interval Y becomes a value that changes in proportion to the value of the movement speed X(m/s). In a case where, for example, the movement speed is X1(m/s), the image-capture time interval becomes Y1, and in a case where, for example, the movement speed becomes X2(m/s), the image-capture time interval changes to Y2. However, X1≠X1, and Y1≠Y1.

Next, the image-capture interval determination unit 35, in a process of step S22, sends the image-capture time interval Y obtained in accordance with equation (5) above to the driving control unit 36. As a result, the relevant driving control unit 36 causes the camera unit 14 to perform continuous image capture at the image-capture time interval.

Figure 12:
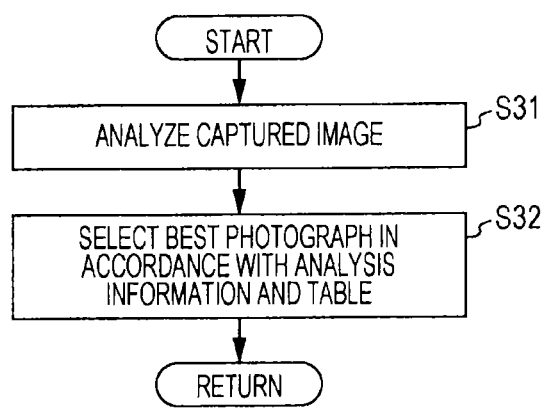
FIG. 12 is a detailed flowchart of a selection process of a best image in step S8 of FIG. 9.

FIG. 12 illustrates a detailed flowchart of a selection process of a best image in step S8 of FIG. 9.

In this flowchart of FIG. 12, in a process of step S31, the image analysis unit 21 of the image analysis/selection unit 12 analyzes each image that is continuously captured and stored during the above-mentioned continuous image-capture mode for selecting a best image, and passes the analysis information thereof to the image selection unit 23.

In a process of step S32, the image selection unit 23 selects a best image that seems to be preferable or favored by the user on the basis of the analysis information and the above-mentioned information of the table. The best image selected by the relevant image selection unit 23 is, for example, displayed on a display screen or is separately stored in accordance with instructions from the user.

Figure 13:
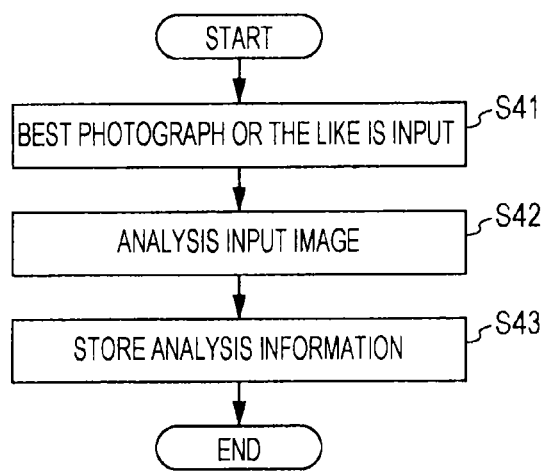
FIG. 13 is a detailed flowchart of an analysis process of an image that is input in advance.

FIG. 13 illustrates a detailed flowchart of an analysis process of an image that is input in advance.

In this flowchart of FIG. 13, in a process of step S41, when, for example, an image, such as a photograph, which is selected by the user himself/herself, is input, the image analysis unit 21, in a process of step S42, analyzes the relevant input image in the same manner as that described above.

Then, in a process of step S43, the image analysis/selection unit 12, for example, registers the analysis information in a table or reflects the analysis information in the existing table, and also stores the analysis information in, for example, a non-volatile memory of the storage unit 10.

Figure 14:
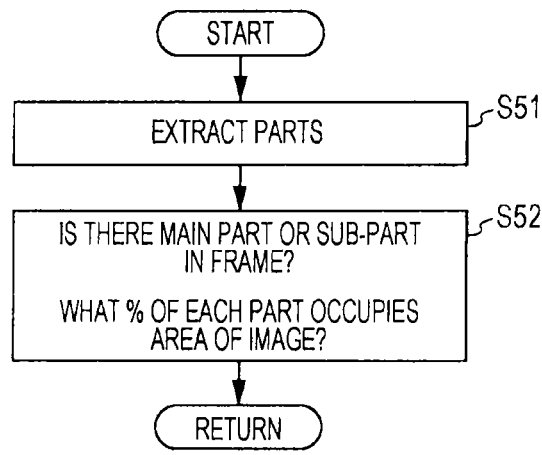
FIG. 14 is a detailed flowchart of image analysis processes in step S31 of FIG. 12 and in step S41 of FIG. 13.

FIG. 14 illustrates a detailed flowchart of the image analysis processes performed in step S31 shown in FIG. 12 and in step S41 shown in FIG. 13. In the case of step S31 shown in FIG. 12, the below described analysis target image is each image that is continuously captured and stored in the continuous image-capture mode for selecting a best image. In the case of step S41 shown in FIG. 13, the below described analysis target image is, for example, an image that is input in advance.

In this flowchart of FIG. 14, in a process of step S51, the image analysis unit 21 detects, for example, the contour (edge) of the analysis target image as described above, thereby extracting the main parts, sub-parts, and the like.

Next, in a process of step S52, the image analysis unit 21 obtains an area in which each of the parts occupies in the image frame. Then, scores are given in accordance with the percentage of each of the occupied areas, and those scores are made to be analysis information.

Figure 15:
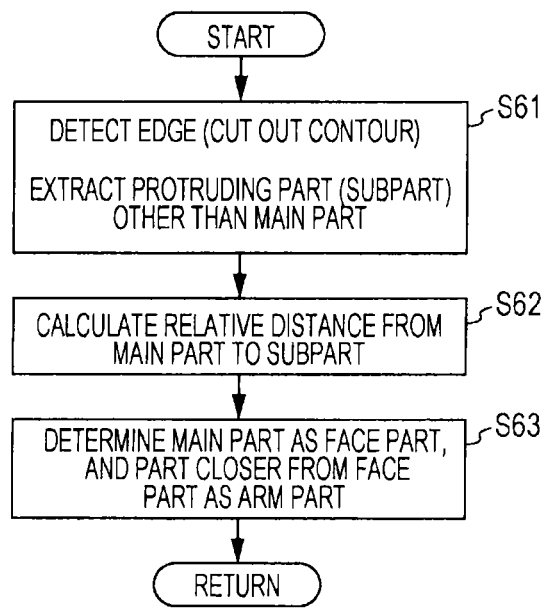
FIG. 15 is a detailed flowchart of a part extraction process in step S51 of FIG. 14.

FIG. 15 illustrates a detailed flowchart of a part extraction process in step S51 of FIG. 14.

In this flowchart of FIG. 15, in a process of step S61, the image analysis unit 21 detects, as an example, the contour of the analysis target image, detects a face part that is detected by using a face detection technology such as that described above as a main part on the basis of the contour information, and additionally extracts protruding parts other than the relevant main part as sub-parts.

Next, in a process of step S62, the image analysis unit 21 calculates a relative distance from the main part to each subpart.

Then, in a process of step S63, the image analysis unit 21 determines the sub-part closer to face part that is the main part as, for example, an arm (hand, front leg) part and the sub-part more far away therefrom as, for example, a leg (foot, rear leg) part.

SUMMARY

According to an image capturing apparatus embodiment, the embodiment includes an image capturing device that captures an image of a subject according to a mode of operation, the mode of operation being user-selectable between at least one of a normal image capture mode of operation and a continuous image capture mode of operation;

an image-capture control device that controls an image-capturing operation performed by the image capturing device in accordance with a selected mode of operation; and a speed detection device that detects a movement speed of the subject during the image-capturing operation, wherein when the image-capturing device is operating in the continuous image capture mode of operation, the image-capture control device controls an image-capture time interval in accordance with the movement speed of the subject.

According to one aspect the speed detection device calculates an angle between the subject before movement and the subject after movement, and calculates the movement speed based on a movement distance of the subject.

According to another aspect the image-capture control device determines an image-capture time interval using the movement speed.

According to another aspect the image-capture control device calculates the image-capture time interval as a product of the movement speed and a predetermined coefficient.

According to another aspect that apparatus further includes an image analysis device that performs an analysis of a plurality of captured images that are captured in the continuous image capture mode; and an image selection device that selects an image as a best image from the captured images by comparing the captured images with the analysis and stored information.

According to another aspect the analysis performed by the image analysis device includes extracting parts of an analysis target image in the captured images, and determines whether the analysis target image includes a main part or a sub-part in an analysis frame.

According to another aspect when the analysis target image is determined to include the main-part or sub-part, the image analysis device identifies a portion of the main part or sub-part that is within the analysis frame.

According to another aspect the image analysis device is configured to detect an edge of the analysis target image to identify a presence of the main part and a first sub-part and a second sub-part of the analysis target image, and calculate a distance from the main part to the first sub-part and a distance from the main part to the second sub-part, and select the first sub-part when the distance from the main part to the first sub-part is less than the distance from the main part to the second sub-part, and the second sub-part when the distance from the main part to the first sub-part is greater than the distance from the main part to the second sub-part.

According to a method embodiment the method includes capturing an image of an image capturing device of a subject according to a mode of operation, the mode of operation being user-selectable between at least one of a normal image capture mode of operation and a continuous image capture mode of operation;

controlling an image-capturing operation performed by the image capturing device in accordance with a selected mode of operation; and detecting with a speed detection device a movement speed of the subject during the capturing, wherein when the capturing is performed in the continuous image capture mode of operation, the controlling controls an image-capture time interval in accordance with the movement speed of the subject.

According to one aspect of the embodiment, the detecting includes calculating an angle between the subject before movement and the subject after movement, and calculating the movement speed based on a movement distance of the subject.

According to another aspect, the method further includes determining an image-capture time interval using the movement speed.

According to another aspect the determining includes calculating the image-capture time interval as a product of the movement speed and a predetermined coefficient.

According to another aspect, the method further includes performing an analysis of a plurality of captured images that are captured in the continuous image capture mode; and selecting an image as a best image from the captured images by comparing the captured images with the analysis and stored information.

According to another aspect the performing includes extracting parts of an analysis target image in the captured images, and determining whether the analysis target image includes a main part or a sub-part in an analysis frame.

According to another aspect when the performing determines that the analysis target image includes the main-part or sub-part, the performing determines a portion of the main part or sub-part that is within the analysis frame.

According to another aspect the performing includes detecting an edge of the analysis target image to identify a presence of the main part and a first sub-part and a second sub-part of the analysis target image, and includes calculating a distance from the main part to the first sub-part and a distance from the main part to the second sub-part, and selects the first sub-part when the distance from the main part to the first sub-part is less than the distance from the main part to the second sub-part, and the second sub-part when the distance from the main part to the first sub-part is greater than the distance from the main part to the second sub-part.

According to a non-transitory computer readable storage device embodiment, the storage device contains instructions that when executed by a processing circuit performs a method, the method includes capturing an image of an image capturing device of a subject according to a mode of operation, the mode of operation being user-selectable between at least one of a normal image capture mode of operation and a continuous image capture mode of operation;

controlling an image-capturing operation performed by the image capturing device in accordance with a selected mode of operation; and detecting with a speed detection device a movement speed of the subject during the capturing, wherein when the capturing is performed in the continuous image capture mode of operation, the controlling controls an image-capture time interval in accordance with the movement speed of the subject.

According to another aspect the detecting includes calculating an angle between the subject before movement and the subject after movement, and calculating the movement speed based on a movement distance of the subject.

According to another aspect, the method further includes determining an image-capture time interval using the movement speed.

According to another aspect the determining includes calculating the image-capture time interval as a product of the movement speed and a predetermined coefficient.

As has been described above, the mobile terminal having a camera function according to the embodiment of the present disclosure detects the movement speed of a subject in a case where, for example, a subject that is moving at a high speed is to be continuously captured, and thus can dynamically control the image-capture time interval, the number of continuously captured images, and the like at the time of continuous image capture on the basis of the movement speed. Consequently, it is possible for the mobile terminal of the present embodiment to deal with even a case in which, for example, a subject is moving, and possible to capture satisfactory images.

Furthermore, the mobile terminal of the present embodiment can extract main parts of the relevant subject and sub-parts thereof as necessary by analyzing a subject, and can select a best or better image for the user on the basis of the information on each of those parts. Consequently, it becomes possible to deal with not only a case in which, for example, a person is used as a subject, but also a case in which various other subjects, such as animals or object bodies, are to be photographed. In addition, it is possible to select many different kinds of captured images that are seemed to be preferable by the user.

In addition, in the mobile terminal of the present embodiment, since the image-capture time interval that is dynamically controlled at the time of the continuous image capture and the selection of the relevant continuously captured image are mutually associated with each other, it is possible to select an image that better matches the purpose of the continuous image capture and the intent of the user.

The mobile terminal of the present embodiment, as long as it has a camera function of capable of continuous image capture similar to that described above, can be applied to, for example, a highly functional mobile phone terminal, a tablet terminal, or a slate PC, as well as to, for example, a mobile terminal, such as a so-called PDA (Personal Digital Assistant), a notebook personal computer, a portable game machine, or a portable navigation terminal. In addition, the mobile terminal of the present embodiment can also be applied to various stationary electronic devices.

Furthermore, the description of the above-mentioned embodiment is an example of the present invention. Therefore, the present invention is not limited to the above-mentioned embodiment, and various changes are possible in accordance with design and the like within a range not deviating from the technical concept according to the present invention.

In addition, it should be understood, of course, by those skilled in the art that various modifications, combinations, and other embodiments may be made according to the design or other elements insofar as they come within the scope of the claims of the present invention, or the equivalence thereof.

REFERENCE SIGNS LIST

1 . . . communication unit, 2 . . . control unit, 3 . . . operation unit, 4 . . . display unit, 5 . . . audio input/output unit, 6 . . . external memory slot, 8 . . . external memory, 10 . . . storage unit, 12 . . . image analysis/selection unit, 13 . . . image-capture control arithmetic operation unit, 14 . . . camera unit, 15 . . . light-emitting unit, 21 . . . image analysis unit, 22 . . . analysis/weighting unit, 23 . . . image selection unit, 31 . . . image pickup signal processing unit, 32 . . . subject detection unit, 33 . . . movement distance calculation unit, 34 . . . speed calculation unit, 35 . . . image-capture interval determination unit, 36 . . . driving control unit

The invention claimed is:

1. An information processing apparatus comprising:
image-capture control circuitry configured to control an image-capturing operation performed by an image capturing device that captures an image of a subject by a continuous image capture mode of operation;
speed detection circuitry configured to detect a movement speed of the subject during the image-capturing operation, wherein the image-capture control circuitry controls an image-capture time interval in accordance with the movement speed of the subject, wherein
the image-capture control circuitry decides the image-capture time interval based on the movement speed of the subject; and
image analysis circuitry configured to determine whether an analysis target image includes a main part or a sub part in a frame and a percentage area of the frame occupied by the main part or sub part.

2. The image capturing apparatus of claim 1, wherein said speed detection circuitry calculates an angle between the subject before movement and the subject after movement.

3. The image capturing apparatus of claim 2, wherein the image-capture control circuitry determines the image-capture time interval using the movement speed.

4. The image capturing apparatus of claim 1, wherein:
the image analysis circuitry performs an analysis of a plurality of captured images that are captured in the continuous image capture mode; and further comprising
image selection circuitry that selects the analysis target image as a best image from the captured images by comparing the captured images with the analysis and stored information.

5. The image capturing apparatus of claim 4, wherein
the analysis performed by the image analysis circuitry includes extracting parts of the analysis target image in the captured images, and determines whether the analysis target image includes the main part or the sub-part in the frame.

6. The image capturing apparatus of claim 5, wherein
when the analysis target image is determined to include the main-part or sub-part, the image analysis circuitry identifies a portion of the main part or sub-part that is within the frame.

7. The image capturing apparatus of claim 5, wherein
the image analysis circuitry is configured to:
detect an edge of the analysis target image to identify a presence of the main part and a first sub-part and a second sub-part of the analysis target image, and calculate a distance from the main part to the first sub-part and a distance from the main part to the second sub-part, and
select
the first sub-part when the distance from the main part to the first sub-part is less than the distance from the main part to the second sub-part, and
the second sub-part when the distance from the main part to the first sub-part is greater than the distance from the main part to the second sub-part.

8. An image capturing method comprising:
controlling an image-capturing operation performed by image capturing circuitry that captures an image of a subject by a continuous image capture mode of operation; and
detecting with speed detection circuitry a movement speed of the subject during the capturing, wherein
the controlling controls an image-capture time interval in accordance with the movement speed of the subject, decides the image-capture time interval based on the movement speed of the subject, and determines whether an analysis target image includes a main part or a sub part in a frame and a percentage area of the frame occupied by the main part or sub part.

9. The image capturing method of claim 8, wherein
said detecting includes calculating an angle between the subject before movement and the subject after movement, and calculating the movement speed based on a movement distance of the subject.

10. The method of claim 8, further comprising:
performing an analysis of a plurality of captured images that are captured in the continuous image capture mode; and
selecting the analysis target image as a best image from the captured images by comparing the captured images with the analysis and stored information.

11. The method of claim 10, wherein
the performing includes extracting parts of the analysis target image in the captured images, and determining whether the analysis target image includes the main part or the sub-part in the frame.

12. The method of claim 11, wherein
when the performing determines that the analysis target image includes the main-part or sub-part, the performing determines a portion of the main part or sub-part that is within the the frame.

13. The method of claim 11, wherein the performing includes:
detecting an edge of the analysis target image to identify a presence of the main part and a first sub-part and a second sub-part of the analysis target image, and includes calculating a distance from the main part to the first sub-part and a distance from the main part to the second sub-part, and
selecting
the first sub-part when the distance from the main part to the first sub-part is less than the distance from the main part to the second sub-part, and
the second sub-part when the distance from the main part to the first sub-part is greater than the distance from the main part to the second sub-part.

14. A non-transitory computer readable storage device that contains instructions that when executed by a processing circuit performs a method, the method comprising:
controlling an image-capturing operation that captures an image of a subject by a continuous image capture mode of operation; and
detecting a movement speed of the subject during the capturing, wherein
the controlling controls an image-capture time interval in accordance with the movement speed of the subject, decides the image-capture time interval based on the movement speed of the subject, and determines whether an analysis target image includes a main part or a sub part in a frame and a percentage area of the frame occupied by the main part or sub part.

15. The storage of claim 14, wherein
said detecting includes calculating an angle between the subject before movement and the subject after movement.

* * * * *